United States Patent [19]

McKenzie

[11] Patent Number: 4,906,041
[45] Date of Patent: Mar. 6, 1990

[54] MULTI-PURPOSE END-GATE FOR OVERLAND VEHICLES

[76] Inventor: Michael R. McKenzie, 1130 S. Belford, Holyoke, Colo. 80734

[21] Appl. No.: 309,352

[22] Filed: Feb. 13, 1989

[51] Int. Cl.⁴ .............................................. B60P 1/00
[52] U.S. Cl. ...................................... 296/61; 280/30; 414/537
[58] Field of Search ......................... 296/61; 414/537; 280/301

[56] References Cited

U.S. PATENT DOCUMENTS

| | | | |
|---|---|---|---|
| 3,642,156 | 2/1972 | Stenson | 414/537 |
| 3,713,553 | 1/1973 | Curtis et al. | 296/61 |
| 3,834,565 | 9/1974 | Goodman et al. | 296/61 |
| 4,735,454 | 4/1988 | Bernard | 296/61 |

*Primary Examiner*—Robert R. Song
*Attorney, Agent, or Firm*—George R. Nimmer

[57] ABSTRACT

For use in combination along the transversely extending horizontal rear-end of a pickup truck or other overland vehicle, there is described an upright end-gate that is also alternatively employable as a ramp or as a trailer whenever panels of the end-gate are freed from their upright gating condition. In the upright gating condition, the multi-purpose end-gate includes:

(A) an upright U-shaped frame member that is attachable to the vehicle rear-end;
(B) an upright laminarly extending first-panel including a transversely extending trail-end removably pivotably attached along a first-pivot to the frame member and also a transversely extending lofty lead-end, and pivotably attached strut located within the laminar confines of the first-panel;
(C) an upright laminarly extending second-panel including trailward-end extending along and pivotably connected to the first-panel lead end, and including below the trailward-end a leadward-end provided with drawbar-attachment capability;
(D) capability for maintaining the two panels substantially coplanar whenever the end-gate is freed from gating condition and thereafter employed as a ramp or as a trailer;
(E) wheels or other ground engagement carried at gating condition but thereafter employable at the strut when the end-gate is in the trailer mode.

6 Claims, 2 Drawing Sheets

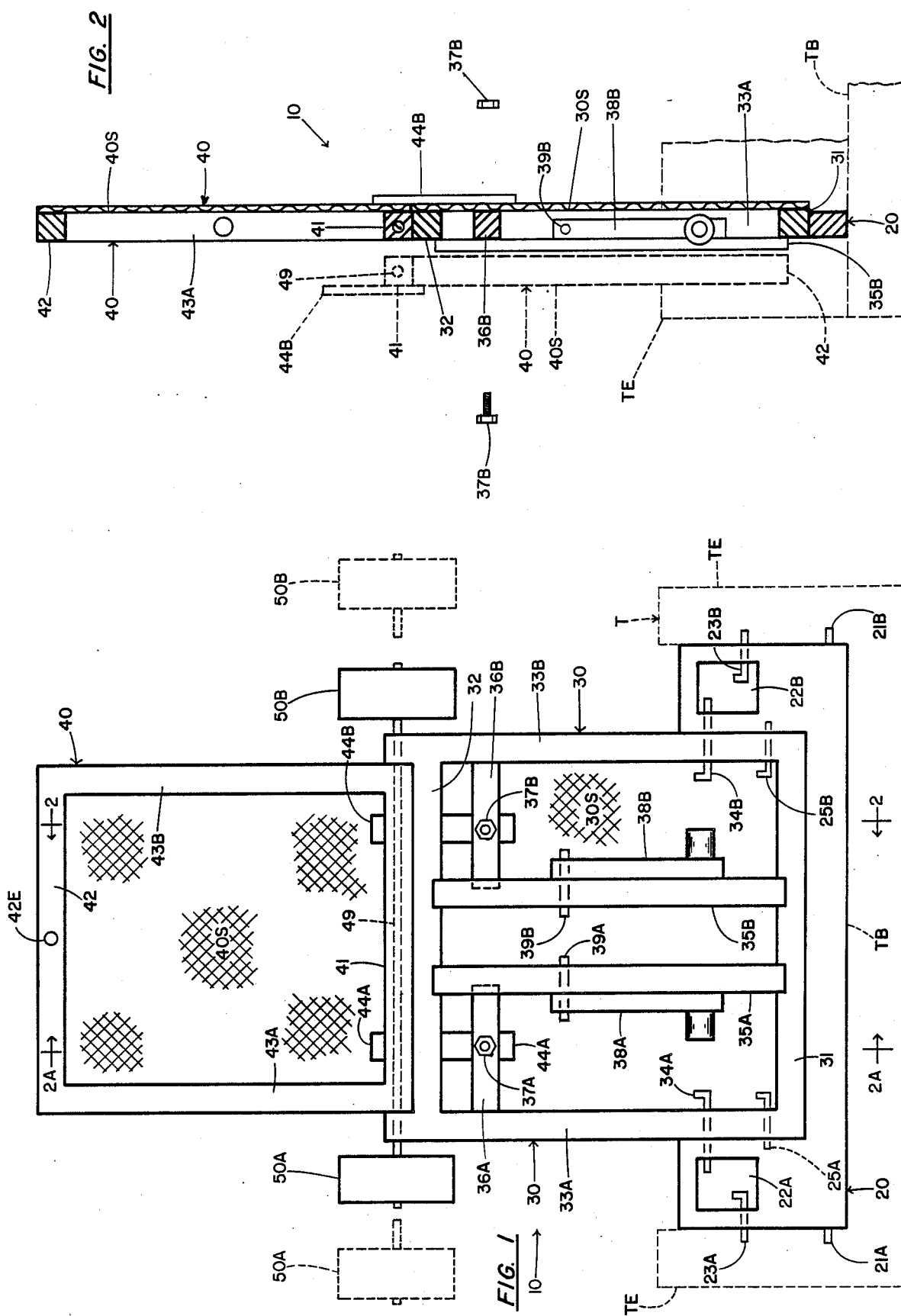

MULTI-PURPOSE END-GATE FOR OVERLAND VEHICLES

BACKGROUND OF THE INVENTION

For usage at the transversely extending horizontal rear-end of a pickup truck or other overland vehicle, the prior art teaches numerous structures specifically and exclusively intended for usage as an end-gate or specifically and exclusively intended for usage as a ramp. However, insofar as known to the applicant herein, the prior art does not allude to a singular vehicular end-gate that is also alternatively employable as a ramp or as a trailer.

OBJECTIVE OF THE INVENTION

It is accordingly the general objective of the present invention to provide, for usage with a pickup truck or other over-land vehicle, a multi-purpose end-gate structure that is alternatively employable in the upright gating, in the inclined ramp, and in the trailer modes.

GENERAL STATEMENT OF THE INVENTION

With the aforementioned general objective in view, and together with ancillary and specific objectives which will become more apparent as this description proceeds, the vehicular end-gate in its upright gating condition comprises: an upright U-shaped frame member externally attachable across a vehicle rear-end; an upright first-panel having a tail-end removably pivotably attached along a first-pivot means to the frame member, the first-panel also having a transversely extending lead-end overlying the trail-end, and pivotably attached strut means located within the laminar confines of the first-panel; an upright second-panel located rearwardly of an substantially parallel to the first-panel, the second-panel including a trailward-end that is pivotably attached along a second-pivot means to the first-panel lead-end and also including a leadward-end provided with drawbar-attachment means; inter-panels rigidifying means that is wholly inactive when the first-panel and second-panel are employed in upright parallelism but that actively maintains the two panels substantially co-planar whenever the end-gate is pivoted at the second-pivot means for alternative employments as ramp or trailer; and wheels or other terrain-traversing means removably attachable to the strut means whenever the end-gate panels are to be freed at the first-pivot means from the frame member and employed in a trailer condition mode.

BRIEF DESCRIPTION OF THE DRAWING

In the drawing wherein like characters refer to like parts in the several views, and in which:

FIG. 1 is a rearward elevational view of a representative embodiment (10) of the vehicular end-gate of the present invention and in a transitory stage between gating condition and ramp condition;

FIG. 2 is a sectional elevational view taken along line 2—2 of FIG. 1 and wherein at the second-panel: solid lines refer to the FIG. 1 transitory stage, and phantom lines refer to the vehicular gating condition;

DETAILED DESCRIPTION OF THE DRAWING

Figure 3:
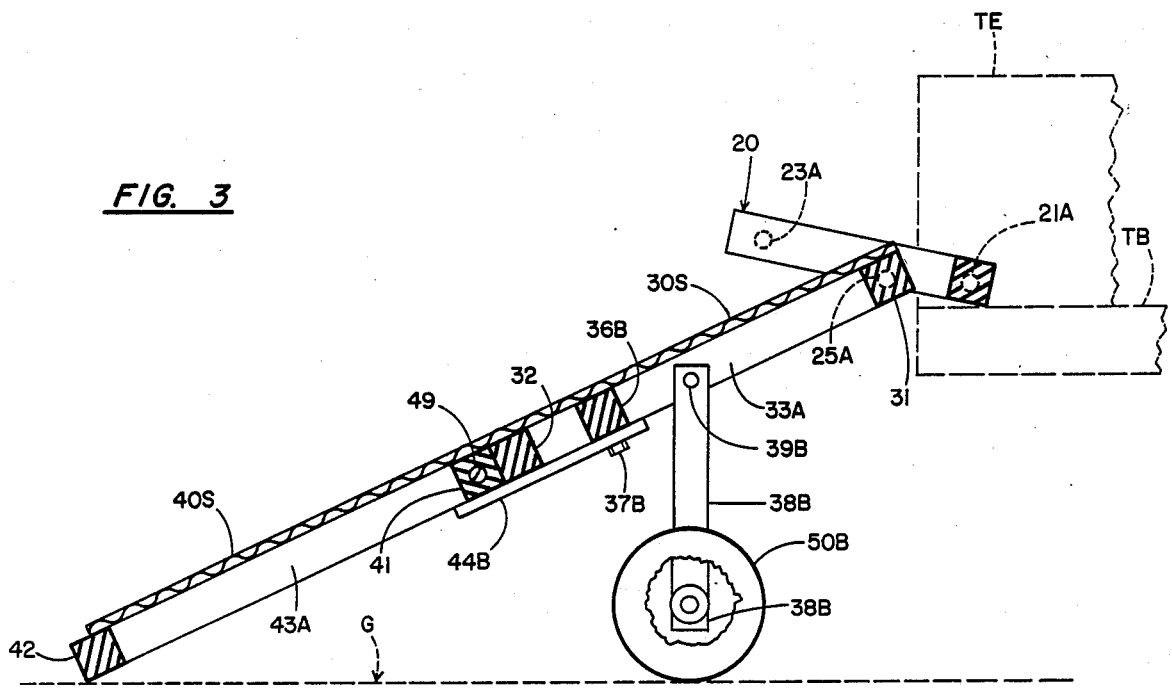
FIG. 3 is a sectional elevational view similar to FIG. 2 but showing the end-gate in a ramp condition.

The reader's attention is directed initially to drawing FIGS. 1 and 2 that depict the end-gate concept (e.g. embodiment 10) in its vehicle end-gating condition and from which (as alluded to in subsequent drawing Figures) it is thereafter alternatively employable as a ramp or as a trailer. In drawing FIGS. 1 and 2, the rearward end (T) of a representative overland drayage vehicle (e.g. a pickup truck) is shown in phantom line to conventionally comprise substantially parallel truck sides (TE) flanking and extending upwardly from a horizontal truck bed (TB). Representative end-gate 10 comprises:

a laminar U-shaped frame member 20 connected to the rearward extremities of truck sides TE and extendable uprightly from truck bed TB;

a laminar first-panel 30 removably pivotably attachable to and extendable uprightly from the U-shaped frame member, and including pivotably adjustable strut means (38A, 38B) for removably securing terrain-traversing means (e.g. wheels 50A and 50B); and a laminar second-panel 40 pivotably attached to, but co-planarly arrestable with, first-panel 30.

U-shaped frame member 20 has: a transversely extending lower-side extending along truck bed TB; a pair of upright sides extending along truck sides TE; a pair of co-elevational openings (22A, 22B); and at its internal side a transversely extending finite internal-width that is less than the transverse spacing between said openings 22A–22B. At transversely extending colinear frame pivots 21A and 21B, frame member 20 is pivotally attached to lower portions of truck sides TE. However, the pivotably connected (21A–21B) frame member can be temporarily maintained in upright condition with frame-latchpins (23A, 23B) extendable from frame 20 into openings of truck sides TE.

Laminar first-panel 30 comprises a pair of substantially parallel structural members 31 and 32, each having a transverse extent substantially equivalent to said finite internal-width, and wherein: member 31 defines a transversely extending trail-end along the frame member transversely extending internal side; and member 32 defines a lead-end overlying the first-panel trail-end. The distance between transversely extending structural members 31 and 32 is maintained by side members (33A, 33B) and by central members (35A, 35B). First-panel 30 is provided with a sturdy skin (e.g. gridwork 30S attached to members 31–33). Adjacent its trail-end, and at transversely extending colinear first-pivot means (25A, 25B), first-panel 30 is removably pivotably attached to frame member 20. However, the pivotably connected (25A, 25B) first-panel can be temporarily maintained in upright condition with latchpins (34A, 34B) extending from first-panel 30 into frame member 20. The strut means (e.g. 38A, 38B) lies within the laminar confines of first-panel 30 such as being adjustably pivotably attached (39A, 39B) to central structural members (35A, 35B). The strut means is removably equippable with terrain traversing means (e.g. runners, wheels, etc.). For example, wheels 50A and 50B are removably attachable to strut bushing portions located remote of strut pivots 39A–39B. However, prior to installation at the strut means, the terrain traversing means is advantageously stowable at widely transversely separated locations of the end-gate. For example, wheels 50A and 50B might be removably stowably inserted into the respective terminii of a tubular structural member 32.

Laminar second-panel 40 comprises a pair of substantially parallel structural members 41 and 42 wherein: member 41 defines a transversely extending trailward-end alongside structural member 32; and member 42 defines a leadward-end provided with a drawbar-attachment means (e.g. apperture 42E) when the end-gate is in a trailer mode. The distance between transversely extending structural members 41 and 42 is maintained by outboard members (43A, 43B), and the second-panel is provided with a sturdy skin (e.g. gridwork 40S attached to members 41–43). Adjacent its trailward-end (41), and directionally transversely therealong, second-panel 40 is pivotably attached at a second-pivot means (49) to the first-panel lead-end (32). For the end-gating condition, and as indicated in FIG. 2 phantom line, second-panel 40 is positioned rearwardly of and parallel to first-panel 30 and whereat structural members 31 and 42 are at substantial co-elevation.

Solid lines in FIGS. 1 and 2 indicate a transitory condition for second-panel 40 prepatory to alternative employments of panels 30 and 40 as a ramp or as a trailer. For such transitory condition, the end-gate (10) requires a rigidifying means (e.g. 36, 37, 44) that is:
 (i) wholly inactive when both panels (30, 40) are in the uprightly co-parallel end-gating condition shown in FIGS. 1–2 phantom lines; but
 (ii) that, as indicated in FIGS. 1–2 solid lines, is adapted to maintain both panels (30, 40) substantially co-parallel (e.g. at their sturdy skins 30S, 40S).

A representative, but not limiting, rigidifying means comprises strike-plates (44A, 44B) attached to second-panel structural member 41 and extending rigidly trailwardly therefrom, and apertured abutment-plates (36A, 36B) for first-panel 30 and located immediately trailwardly of structural member 32. Accordingly, when second-panel 40 is pivoted upwardly to assume its FIGS. 1–2 solid lines transitory stage, and whereby its strike-plates 44 contact abutment-plates 36, mechanical fasteners (e.g. bolts 37) can be securely removably inserted through contacting plates 36 and 44 to complete the rigidifying means.

Figure 4:
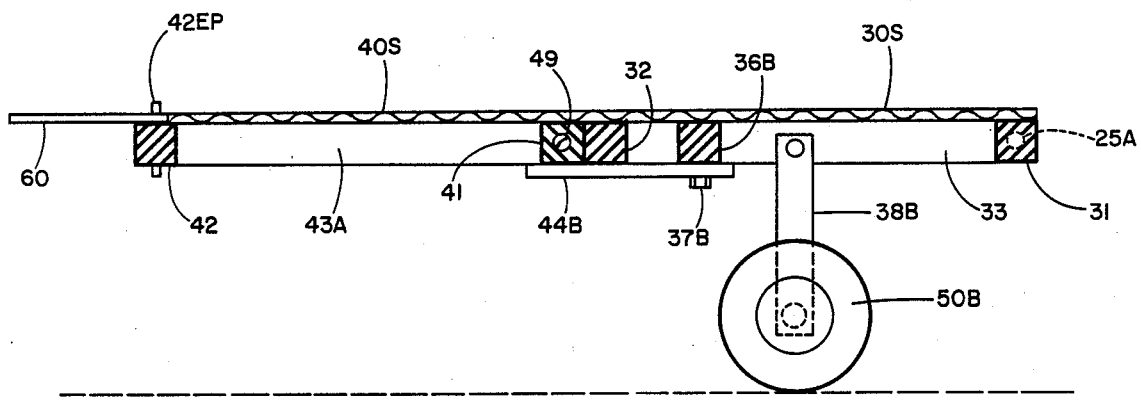
FIG. 4 is a sectional elevational view similar to FIGS. 2 and 3 but showing the end-gate in a trailer condition.

Having now, with reference to FIGS. 1 and 2, discussed the end-gate vehicular gating condition and at the transitory stage thereof, the reader's attention is turned to drawing FIGS. 3 and 4 that depict the end-gate concept (e.g. embodiment 10) in the optional ramp and trailer conditions.

To attain the FIG. 3 ramp condition, and commencing from the FIGS. 1–2 transitory stage:
 (a) the strut means (38A, 38B) are provided with terrain-traversing means (e.g. wheels 50A, 50B) and are pivoted (39A, 39B) away from co-parallelism with central members (35A, 35B); and
 (b) frame-latchpins (23A, 23B) are disengaged from the truck sides (TE) whereby frame 20 can pivot (21A, 21B) to extend rearwardly from truck bed (TB).

Accordingly, the wheels 50 and second-panel 42 are free to abut an underlying substrate (G) whereby a ramp surface (30S, 40S) extends upwardly from substrate G to truck bed TB.

To attain the FIG. 4 trailer condition, and commencing from the FIG. 3 ramp condition:
 (a) the first-pivot means (25A, 25B) is disengaged from the frame member (20); and
 (b) a drayage means (e.g. hitch 60) is removably attached to the second-panel leadward-end 42, such as by passing a pin 42EP through an apertured hitch (60) and said aperture 42E.

From the foregoing, the construction and operation of the multi-purpose end-gate for overland vehicles will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. For use in combination along the transversely extending horizontal rear-end of an overland vehicle, an upright end-gate that is also alternatively employable as a ramp or as a trailer whenever panels portions of the end-gate are freed from their up-right gating condition, said end-gate in the upright gating condition comprising:
 (A) an upright U-shaped frame member at its external side extending along and being attachable along transversely extending frame-pivot means to said vehicle rear-end, said U-shaped frame member at its internal side having a transversely extending finite internal-width;
 (B) an upright laminarly extending first-panel having a said finite internal-width and including a transversely extending trail-end that is removably pivotably attached along a first-pivot means to said frame member, said first-panel also having a transversely extending lead-end that loftily overlies said trail-end, and pivotably attached strut means located within the laminar confines of said first-panel;
 (C) an upright laminarly extending second-panel locatable rearwardly of and substantially parallel to said first-panel, said second-panel having a transverse extent approximating that for said first-panel and including a trailward-end that is pivotably attached along a second-pivot means to the first panel lead-end, said second-panel also having a transversely extending leadward-end provided with drawbar-attachment means;
 (D) inter-panels rigidifying means that is wholly inactive when the first-panel and second-panel are employed in up-right parallelism but that actively maintains the two panels substantially co-planar whenever the end-gate is pivoted at said second-pivot means and for alternative employments as ramp or trailer; and
 (E) terrain-traversing means removably attachable to said strut means whenever the end-gate panels are to be freed at said first-pivot means from said frame member and employed in a trailer mode.

2. The end-gate of claim 1 wherein the terrain-traversing means takes the form of at least two separate terrain-traversible wheels.

3. The end-gate of claim 2 wherein the wheels are separately removably stowably attachable to at least one of said panels and thereat have a transversely extending wheels' spacing exceeding said finite internal-width.

4. In combination with the transversely extending rear-end of an overland vehicle, an upright dual-panels end-gate that is also alternatively employable as a ramp or as a trailer whenever panel portions of the end-gate are freed from their upright gating condition, said end-gate in the upright gating condition comprising:
- (A) an upright U-shaped frame member at its external side extending along and being attached to said vehicle rear-end, said U-shaped frame member at its internal side having a transversely extending finite internal-width;
- (B) an upright laminarly extending first-panel having a transversely extending trail-end that is removably pivotably attached along a first-pivot means to said frame member internal side, said first-panel also having a transversely extending lead-end that loftily overlies said trail-end;
- (C) an upright laminarly extending second-panel located rearwardly of and substantially parallel to said first-panel, said second-panel having a transversely extending trailward-end that is pivotably attached along a second-pivot means to the first panel lead-end, said second-panel below the trailward-end thereof having a transversely extending leadward-end provided with drawbar-attachment means;
- (D) pivotably attached strut means located within the laminar confines of said dual-panels end-gate, each said strut means being adapted to removably engage a terrain-traversing means;
- (E) said terrain-traversing means being removably stowably attached to said dual-panels end-gate at locations remote from said strut means; and
- (F) inter-panels rigidifying means that is wholly inactive when the first-panel and second-panel are employed in up-right paralellism but that actively maintains the two panels substantially co-planar whenever the end-gate is pivoted at said second-pivot means and for alternative employments as ramp or trailer.

5. The end-gate of claim 4 wherein the terrain-traversing means takes the form of at least two separate terrain-traversible wheels.

6. The end-gate of claim 1 wherein the frame-pivot means is located at a lower portion of the U-shaped frame member and wherein said U-shaped frame member at an upper portion is provided with transversely extending frame-latchpins extendable into vehicular openings.

* * * * *